(12) United States Patent  (10) Patent No.: US 8,951,030 B2
Kato et al.  (45) Date of Patent: Feb. 10, 2015

(54) RESIN FILLING DEVICE

(75) Inventors: Susumu Kato, Anjo (JP); Shigeru Maeda, Toyota (JP); Takuya Ooura, Oobu (JP); Motoki Koori, Anjo (JP); Takeshi Yokoyama, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 13/982,123

(22) PCT Filed: Feb. 3, 2012

(86) PCT No.: PCT/JP2012/052457
§ 371 (c)(1),
(2), (4) Date: Jul. 26, 2013

(87) PCT Pub. No.: WO2012/108340
PCT Pub. Date: Aug. 16, 2012

(65) Prior Publication Data
US 2013/0309341 A1    Nov. 21, 2013

(30) Foreign Application Priority Data
Feb. 8, 2011 (JP) ................................. 2011-024551

(51) Int. Cl.
*B29C 43/00* (2006.01)
*B29C 45/14* (2006.01)
*H02K 15/03* (2006.01)
*B29C 33/00* (2006.01)
*H02K 1/27* (2006.01)

(52) U.S. Cl.
CPC ............ *B29C 45/1459* (2013.01); *H02K 15/03* (2013.01); *B29C 33/0066* (2013.01); *H02K 1/276* (2013.01)

USPC .......................................... 425/126.1

(58) Field of Classification Search
USPC ....................................... 425/126.1
See application file for complete search history.

(56) References Cited

U.S. PATENT DOCUMENTS

| 2002/0047409 | A1 | 4/2002 | Hiroyuki et al. |
| 2007/0134368 | A1 | 6/2007 | Okamoto et al. |

FOREIGN PATENT DOCUMENTS

| JP | S58-172958 | 10/1983 |
| JP | U-06-002976 | 1/1994 |
| JP | A-2002-044915 | 2/2002 |

(Continued)

OTHER PUBLICATIONS

Apr. 24, 2012 International Search Report issued in International Application No. PCT/JP2012/052457.

*Primary Examiner* — Joseph S Del Sole
*Assistant Examiner* — John Robitaille
(74) *Attorney, Agent, or Firm* — Oliff PLC

(57) ABSTRACT

A resin filling device for a laminated iron core, the resin filling device being used when a magnet insertion hole provided in the laminated iron core of a rotor for an electric motor is filled with a molten resin for fixing a magnet. The resin filing device configured with a resin feeding mold, an opposing mold, and a pressing mechanism that applies a compression force with the laminated iron core sandwiched between the resin feeding mold and the opposing mold. The resin feeding mold includes one or more discharge outlets arranged so as to face the opening of the magnet insertion hole, and configured to include a diameter reducing part in which an inner diameter is reduced gradually along a discharge direction of the molten resin. A diameter reducing part is arranged inside of the laminated iron core.

4 Claims, 9 Drawing Sheets

(56) References Cited

FOREIGN PATENT DOCUMENTS

| | | |
|---|---|---|
| JP | A-2002-199671 | 7/2002 |
| JP | A-2006-211748 | 8/2006 |
| JP | A-2006-211887 | 8/2006 |
| JP | A-2007-152517 | 6/2007 |
| JP | A-2007-159342 | 6/2007 |
| JP | A-2008-054376 | 3/2008 |
| JP | A-2010-017075 | 1/2010 |
| JP | A-2010-187535 | 8/2010 |

F I G . 6
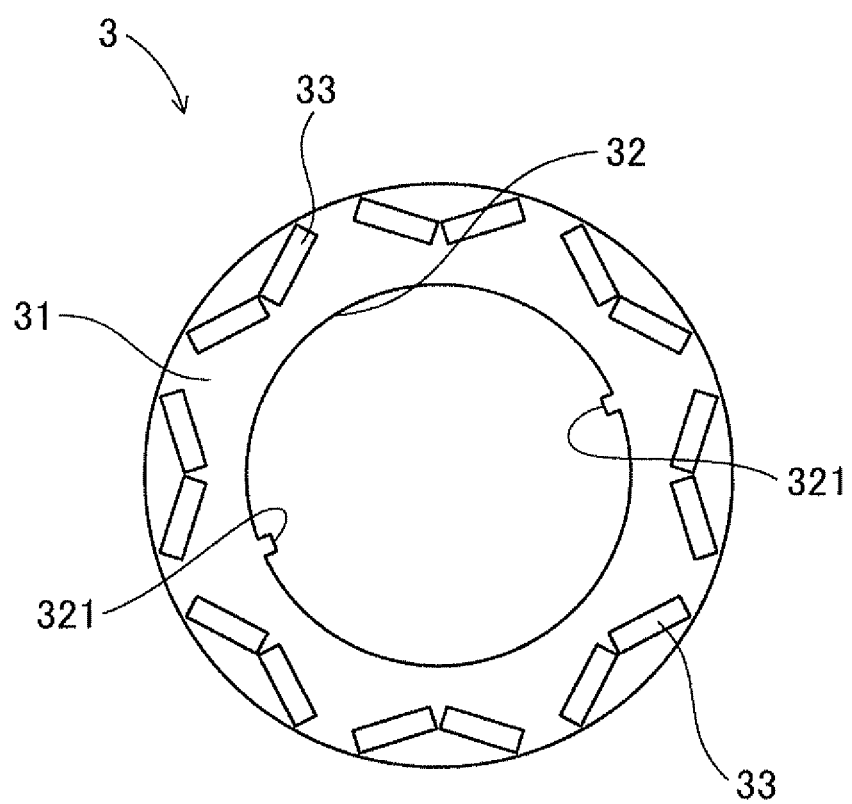

RESIN FILLING DEVICE

INCORPORATION BY REFERENCE

The disclosure of Japanese Patent Application No. 2011-024551 filed on Feb. 8, 2011 including the specification, drawings and abstract is incorporated herein by reference in its entirety.

BACKGROUND OF THE INVENTION

The present invention relates to a resin filling device that is used when a molten resin for a rotor for an electric motor is filled.

DESCRIPTION OF THE RELATED ART

In manufacturing a rotor for an electric motor, a laminated iron core is formed by stacking iron core pieces that are formed into a desired shape, and, after permanent magnets are inserted into magnet insertion holes of the laminated iron core, the laminated iron core is heated. Then, a molten resin is filled into the magnet insertion holes using a resin filling device, which fixes the permanent magnets. When the resin filling device and the laminated iron core are separated from each other after the resin filled in the magnet insertion holes is cured, residual resin inside of discharge outlets of the resin filling device remains on a laminated iron core side, and flash is thus formed.

If an electric motor is manufactured using the laminated iron core with flash remaining, a component arranged around the laminated iron core contacts with the flash in the electric motor. This is likely to cause a problem such as that the electric motor goes wrong because the component is damaged or the flash falls. In order to prevent such problem, flash is removed in a production line of a rotor for an electric motor, and a resin filling method described in Japanese Patent Application Publication No. 2008-54376 (JP 2008-54376 A) for preventing flash from being produced is proposed.

SUMMARY OF THE INVENTION

In order to remove flash in a production line of a rotor for an electric motor, it is necessary to add a flash removal process that requires equipment dedicated to flash removal or an operator who removes flash manually. Since more work is produced by adding the flash removal process, production efficiency is likely to be reduced. Moreover, since equipment cost, labor cost and so on are increased by arranging equipment or an operator dedicated to flash removal, a production cost is increased.

According to the method described in Patent Document 1, a dummy plate having holes serving as discharge outlets for a molten resin is provided between an upper mold and a laminated iron core. After magnet insertion holes of the laminated iron core are filled with the molten resin and the resin in cured, the dummy plate is separated from the laminated iron core, and residual resin inside of the discharge outlets is thus removed from the laminated iron core. However, because it is not possible to control split positions of the cured resin, flash may be formed on a laminated iron core side, and it is thus difficult to reliably remove the flash.

The present invention has been accomplished in view of the above-mentioned problems, and aims to provide a resin filling device for a rotor for an electric motor, which is able to improve production efficiency by preventing flash from being made when a resin is filled.

An aspect of the present invention is a resin filling device for a laminated iron core, the resin filling device being used when a magnet insertion hole provided in the laminated iron core of a rotor for an electric motor is filled with a molten resin for fixing a magnet, characterized by including:

a resin feeding mold that is brought into abutment with an end face of the laminated iron core in which an opening of the magnet insertion hole is made;

an opposing mold that is brought into abutment with an end face of the laminated iron core on the opposite side of the end face with which the resin feeding mold is brought into abutment; and a pressing mechanism part that applies a compression force in a state where the laminated iron core is sandwiched between the resin feeding mold and the opposing mold. In the resin filling device, the resin feeding mold includes one or more discharge outlets arranged so as to face the opening of the magnet insertion hole, and a feeding mechanism part that feeds the molten resin towards the discharge outlet, the discharge outlet includes a diameter reducing part in which an inner diameter is reduced gradually along a discharge direction of the molten resin, a projecting part made by projecting a periphery of the discharge outlet is provided on a surface of the resin feeding mold, and the diameter reducing part is provided inside of the projecting part, and the diameter reducing part is arranged at a position on an inner side of the laminated iron core than the end face of the laminated iron core in the state where the laminated iron core is sandwiched between the resin feeding mold and the opposing mold.

The resin filling device includes the discharge outlet that has the diameter reducing part in which an inner diameter is reduced gradually along a discharge direction of the molten resin. Therefore, when a residual cured resin on an inner side of the discharge outlet is broken and separated, it is possible to break and separate the cured resin by concentrating a stress to a portion of a distal end of the diameter reducing part where the diameter is the smallest. Hence, a position of a broken and separated face is controlled easily, and a relatively smooth broken face is obtained where flash is unlikely to be made. This inhibits flash from being made in the end face of the laminated iron core. Hence, it is not necessary to provide a flash removal process in manufacturing the rotor for an electric motor. This makes it possible to improve production efficiency of the rotor for an electric motor, and reduce equipment costs and production costs.

According to the resin filling device, as flash is reliably prevented from being made when a rein is filled, production efficiency of the rotor for an electric motor can be improved.

BRIEF DESCRIPTION OF THE DRAWINGS

FIG. 6 is a plan view showing the laminated iron core according to the first embodiment;

DETAILED DESCRIPTION OF THE EMBODIMENTS

In the resin filling device, an internal angle made by the diameter reducing part and an axis of the discharge outlet (hereinafter referred to as an angle of diameter reduction α) is preferably in a range from 15° to 60°. In this case, it is ensured that residual cured resin inside of the discharge outlet is separated in the diameter reducing part. When the angle of diameter reduction α is smaller than 15°, it is difficult to obtain the effect of the diameter reducing part. When the angle of diameter reduction α is over 60°, strength of a distal end portion of the discharge outlet is reduced, and it is likely that the discharge outlet is broken.

Preferably, the projecting part, made by projecting a periphery of the discharge outlet, is provided on a surface of the resin feeding mold, and the diameter reducing part is provided inside of the projecting part. In this case, even if a residual resin on an inner side of the discharge outlet remains on the laminated iron core side, and small flash is made, the flash is accommodated inwardly of the end face of the laminated iron core, and no negative effects is caused by the flash. Therefore, problems that may arise due to flash are prevented.

The resin feeding mold preferably includes a plate-like gate plate on a surface of the resin feeding mold, which is brought into abutment with the end face of the laminated iron core, so that the gate plate 2 is able to be attached and detached, and the discharge outlet is provided in the gate plate. In this case, after filling of the magnet insertion hole of the laminated iron core with the resin is completed, the resin feeding mold and the gate plate are separated from each other, and the gate plate and the laminated iron core are moved from the resin filling device so that the next resin filling is able to be performed. Thus, stop time of the resin filling device is reduced, and resin filling is carried out efficiently. After the gate plate and the laminated iron core are moved from the resin filling device and the molten resin is cured, the gate plate is separated from the laminated iron core at an optimum timing, which removes an unnecessary resin member, and prevents flash from being produced more reliably. The unnecessary resin member removed by the gate plate is able to be removed from the gate plate easily. Thus, it is possible to improve working efficiency and maintainability.

It is preferred that the gate plate be structured to be usable as a pallet that transfers the laminated iron core. In this case, by providing a transfer conveyer or a transfer rail, continuous transfer becomes possible. Thus, transfer efficiency is improved.

EMBODIMENT

First Embodiment

An embodiment of the foregoing resin filling device will be explained using FIG. 1 to FIG. 7.

Figure 1:
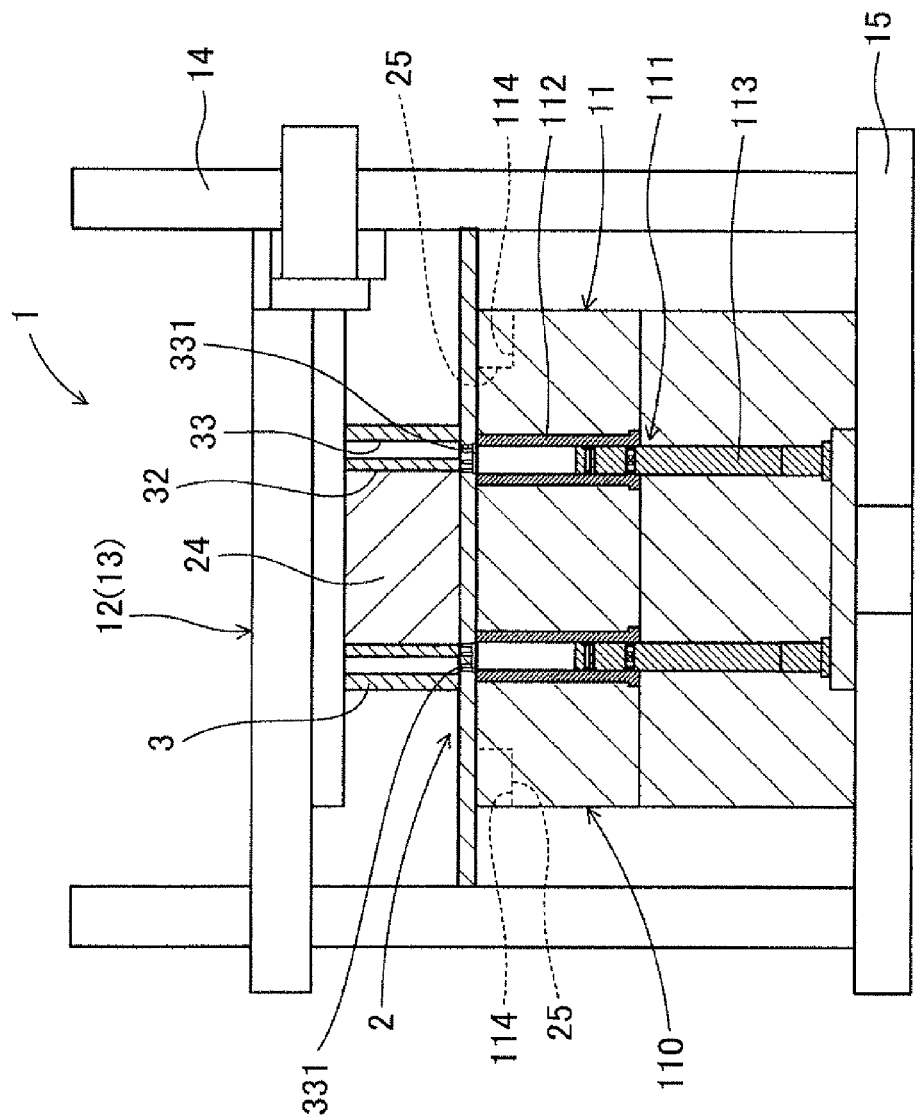
FIG. 1 is an explanatory view showing a resin filling device according to a first embodiment.

As shown in FIG. 1, a resin filling device 1 according to this embodiment is used when magnet insertion holes 33 provided in a laminated iron core 3 of a rotor for an electric motor are filled with a molten resin 34 for fixing magnets. The resin filling device 1 includes a resin feeding mold 11 which is brought into abutment with an end face of the laminated iron core 3 in which openings 331 of the magnet insertion holes 33 are made, and an opposing mold 12 which is brought into abutment with an end face of the laminated iron core 3 opposite to the above-mentioned end face with which the resin feeding mold 11 is brought in to abutment. The resin filling device 1 also includes a pressing mechanism part 13 that applies a compression force in a state where the laminated iron core 3 is sandwiched between the resin feeding mold 11 and the opposing mold 12. In the resin feeding mold 11, two discharge outlets 22 (FIG. 2) are arranged so as to face the opening 331 of the magnet insertion hole 33, and a feeding mechanism part 111 is provided which feeds the molten resin 34 towards the discharge outlets 22. The discharge outlets 22 have diameter reducing parts 221 (FIG. 4) in which inner diameters are reduced gradually along a discharge direction of the molten resin 34.

Details are explained below.

As shown in FIG. 1, the resin filling device 1 according to the embodiment includes the resin feeding mold 11 which is arranged below the laminated iron core 3 and from which the molten resin 34 is fed to the magnet insertion holes 33, and the opposing mold 12 which is arranged above the laminated iron core 3 and structured so as to be able to move up and down.

As shown in FIG. 1, the resin feeding mold 11 is structured by uniting a gate plate 2, which also serves as a pallet on which the laminated iron core 3 is placed as explained above, to a mold body part 110, and a lower face of the gate plate 2 is coupled to an upper face of the mold body part 110 so as to be in abutment with the upper face of the mold body part 110. As shown in the drawing, in the mold body part 110, the feeding mechanism part 111, which feeds the molten resin 34 towards the discharge outlets 22, is provided at a position corresponding to the discharge outlets 22 of the gate plate 2. The feeding mechanism part 111 is made of a cylindrical inner cylinder portion 112, which is arranged vertically, and a plunger 113 which is structured to be able to move back and forth within the inner cylinder portion 112 in an axis direction of the inner cylinder portion 112. A molten resin is supplied into the inner cylinder portion 112 by a molten resin supply device (not shown), and, as the plunger 113 is raised, the molten resin is fed towards the discharge outlets 22 from the inner cylinder portion 112.

As shown in FIG. 1, the opposing mold 12 is arranged above the laminated iron core 3 via guide poles 14 that stand on a base part 15 that supports the resin feeding mold so that the opposing mold 12 is movable up and down. The opposing mold 12 is able to be raised and lowered along the guide poles 14 by the pressing mechanism part 13, and is able to apply a compression force in a state where the laminated iron core 3 is sandwiched between the opposing mold 12 and the resin feeding mold 11.

Figure 3:
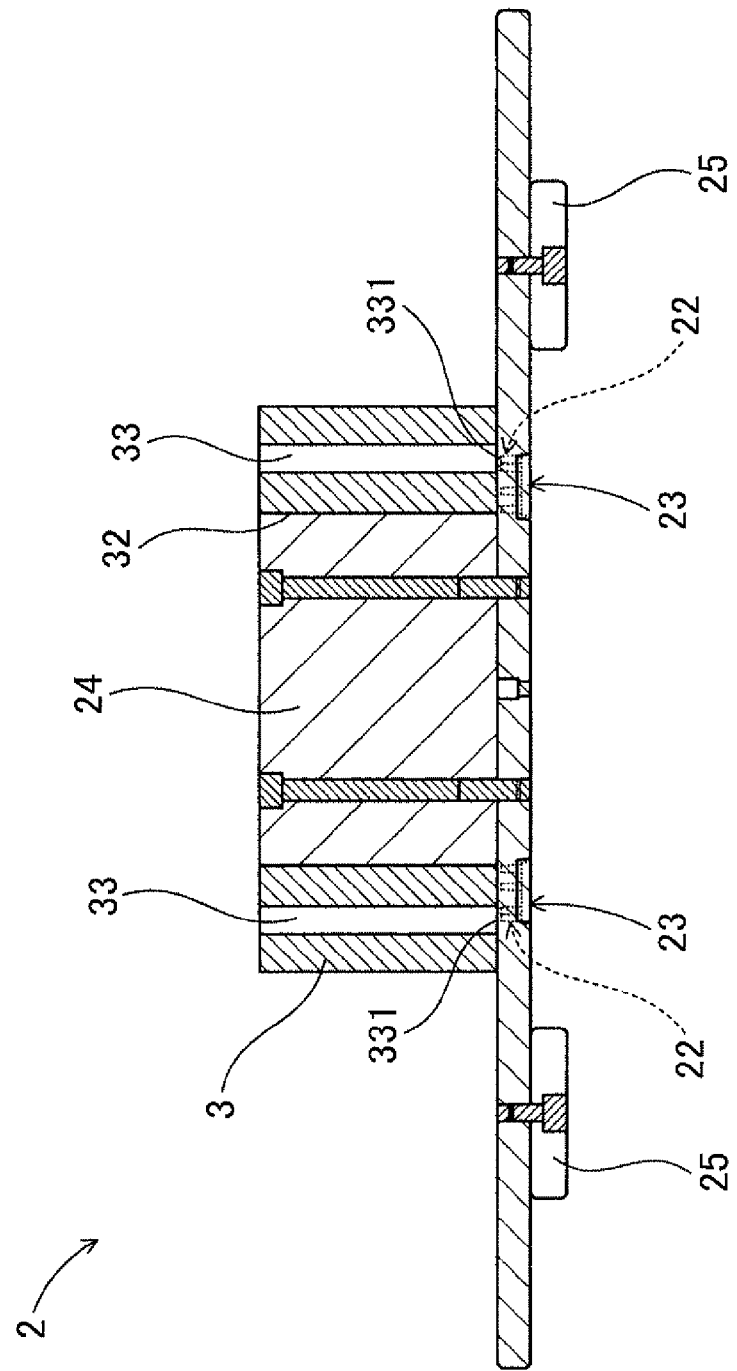
FIG. 3 is a sectional view taken along the line A-A in FIG. 2 in a state where a laminated iron core is placed on the gate plate according to the first embodiment.
Figure 4:
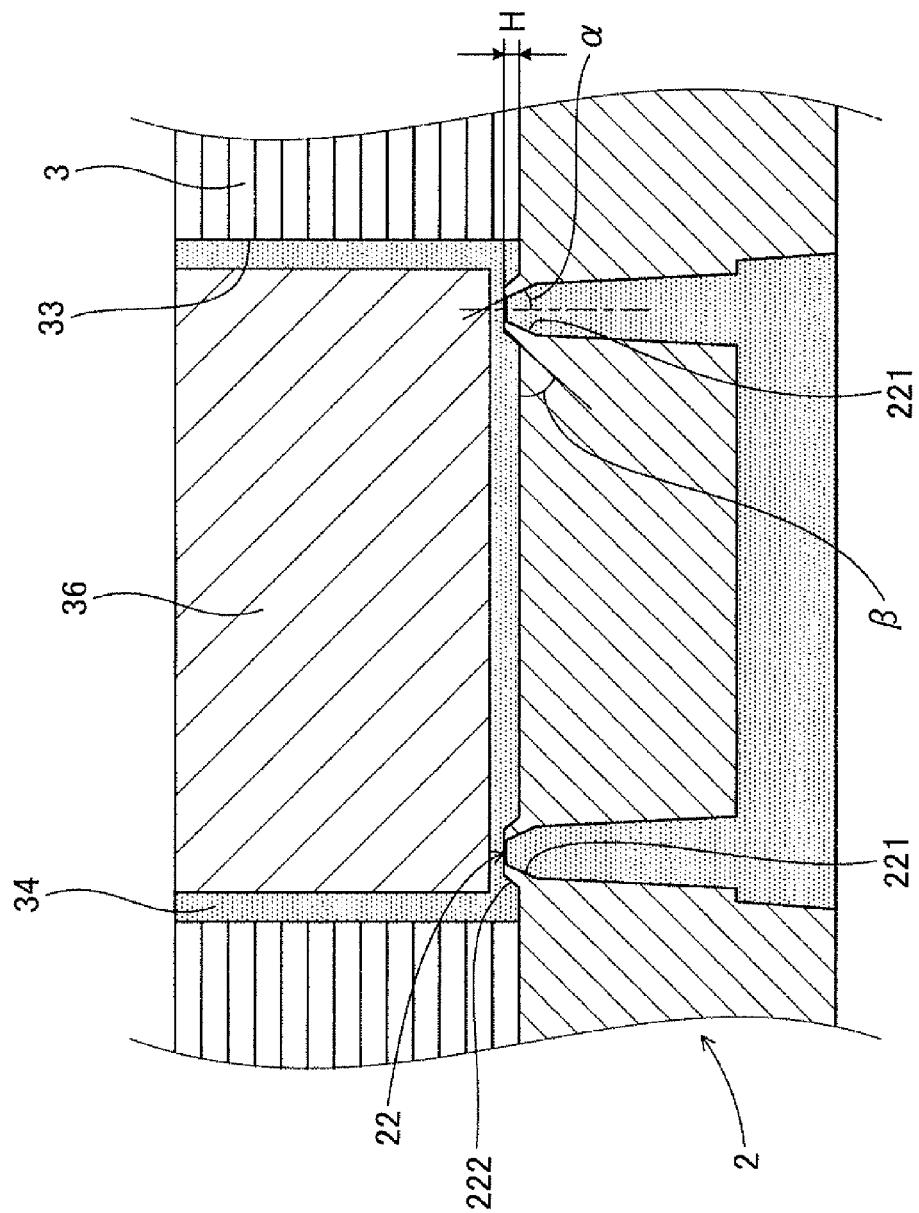
FIG. 4 is a partial enlarged sectional view taken along the line B-B in FIG. 2 in the state where the laminated iron core is placed on the gate plate according to the first embodiment.

As shown in FIG. 3 and FIG. 4, the gate plate 2 is made of a rectangular-shaped flat plate, and has an iron core positioning part 24 on an upper face of the gate plate 2. The gate plate 2 is structured so that the laminated iron core 3 is able to be placed on the upper face of the gate plate 2 by housing the iron core positioning part 24 in an inner periphery part of the laminated iron core 3. Since device positioning parts 25 are provided on a lower face of the gate plate 2, the gate plate 2 is able to be connected to given positions on an upper face of the mold body part 110 of the resin feeding mold 11.

Figure 2:
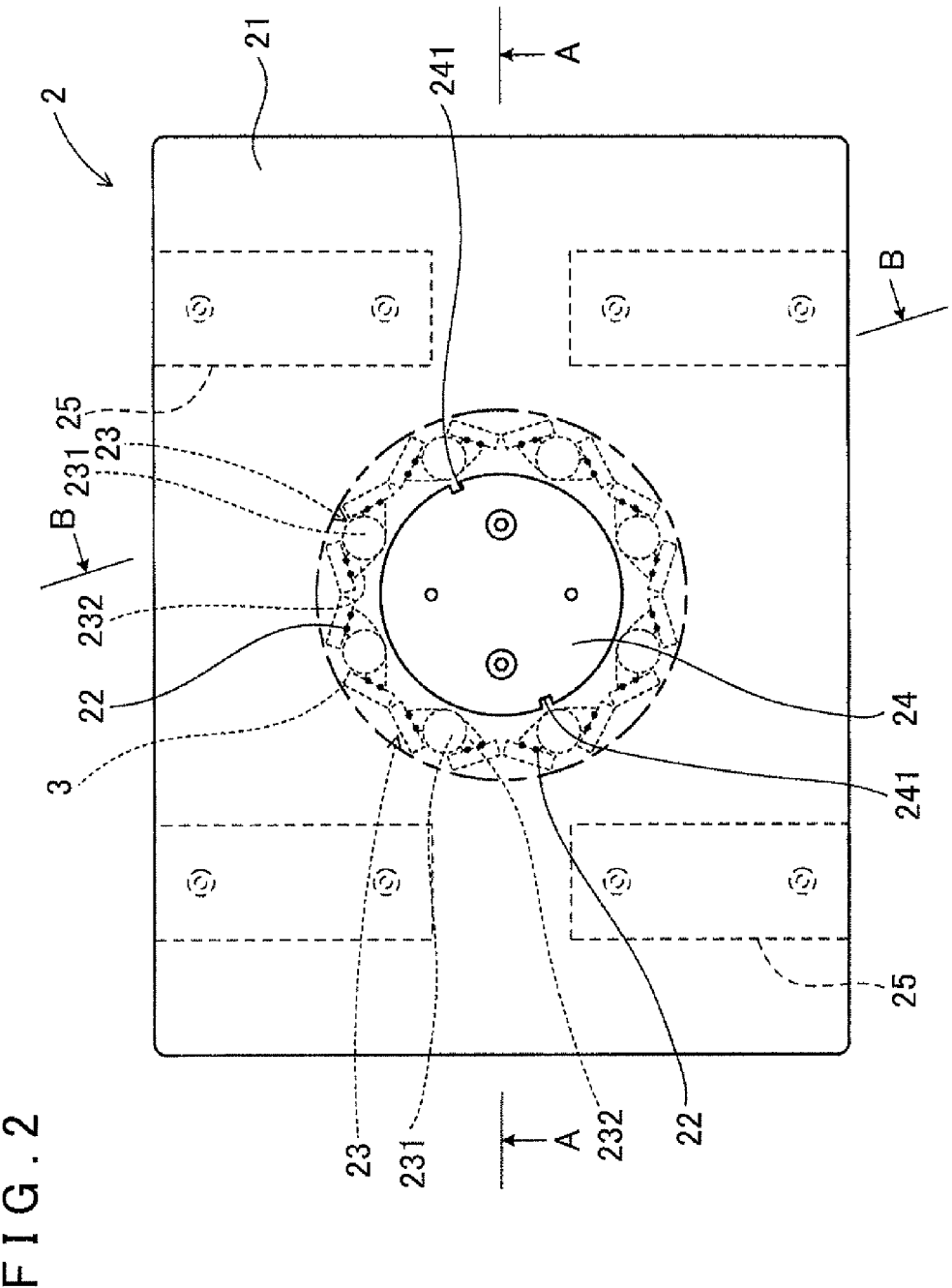
FIG. 2 is a plan view of a gate plate according to the first embodiment.

As shown in FIG. 2 and FIG. 3, in the gate plate 2, the discharge outlets 22 are arranged so as to face the openings 331 of the magnet insertion holes 33 of the laminated iron core 3 that is placed on the upper face of the gate plate 2. In this example, as shown in FIG. 2, two discharge outlets 22 are provided for the opening 331 of each of the magnet insertion holes 33. Each of the discharge outlets 22 is formed so as to penetrate through the gate plate 2 from the lower face to the upper face of the gate plate 2, and, the diameter reducing part 221 (FIG. 4), in which inner diameter is gradually reduced along the discharge direction, is provided in an inner periphery of the discharge outlet 22. A projecting part 222, made by a projecting periphery of the discharge outlet 22, is provided on the upper face of the gate plate 2. The diameter reducing part 221 provided in the inner periphery of the discharge outlet 22 is formed so that the inner diameter is the smallest in the inside of the distal end of the projecting part 222. An outer periphery of the projecting part 222 is made of tapered surface in which the diameter thereof is reduced towards the distal end.

In this example, an opening diameter of the distal end of the discharge outlet 22 is set to φ 1 mm, and a projection height H of the projecting part 222 is set to 0.5 mm. An angle of diameter reduction α is set to 30°, and a taper angle β is set to 60°.

As shown in FIG. 2 and FIG. 3, resin flow paths 23 are formed on the lower face of the gate plate 2 at positions corresponding to the feeding mechanism part 111 included in the mold body part 110, and the resin flow paths 23 each serve as a flow path between the feeding mechanism part 111 and the discharge outlets 22 when the gate plate 2 is connected to the mold body part 110. The resin flow path 23 is structured by an in-flow part 231 that is made of a generally cylindrical recessed part, and branched parts 232 that are two recessed grooves by which the molten resin 34 flown into the in-flow part 231 is branched off to the discharge outlets 22 that are formed and corresponds to the openings 331 of two neighboring magnet insertion holes 33.

As shown in FIG. 2 and FIG. 3, the iron core positioning part 24 provided on the upper face of the gate plate 2 has a generally cylindrical shape, and is structured so that the laminated iron core 3 placed on the gate plate 2 is positioned as the iron core positioning part 24 is inserted into a rotating shaft insertion hole 32 provided in the laminated iron core 3. On an outer periphery of the iron core positioning part 24, positioning recessed grooves 241 are formed at positions of protrusions 321, respectively, that are formed on an inner periphery of the rotating shaft insertion hole 32 of the laminated iron core 3.

As shown in FIG. 2, the device positioning parts 25 provided on the lower face of the gate plate 2 are made of four generally oblong flat plates, and provided at positions of four step parts 114, respectively, formed along an outline of a face of the mold body part 110, which is in abutment with the gate plate 2.

The gate plate 2 and the mold body part 110 are coupled together as the device positioning parts 25 provided on the lower face of the gate plate 2 are engaged with the step parts 114 provided on the upper face of the mold body part 110 by moving the gate plate 2 above the mold body part 110 while the gate plate 2 is relatively raised, and then lowering the gate plate 2. On the contrary, the gate plate 2 and the mold body part 110 are decoupled from each other by relatively raising the gate plate 2 and disengaging the device positioning parts 25 from the mold body part 110.

Next, a method for manufacturing a rotor for an electric motor using the resin filling device 1 according to this example will be explained.

Figure 5:
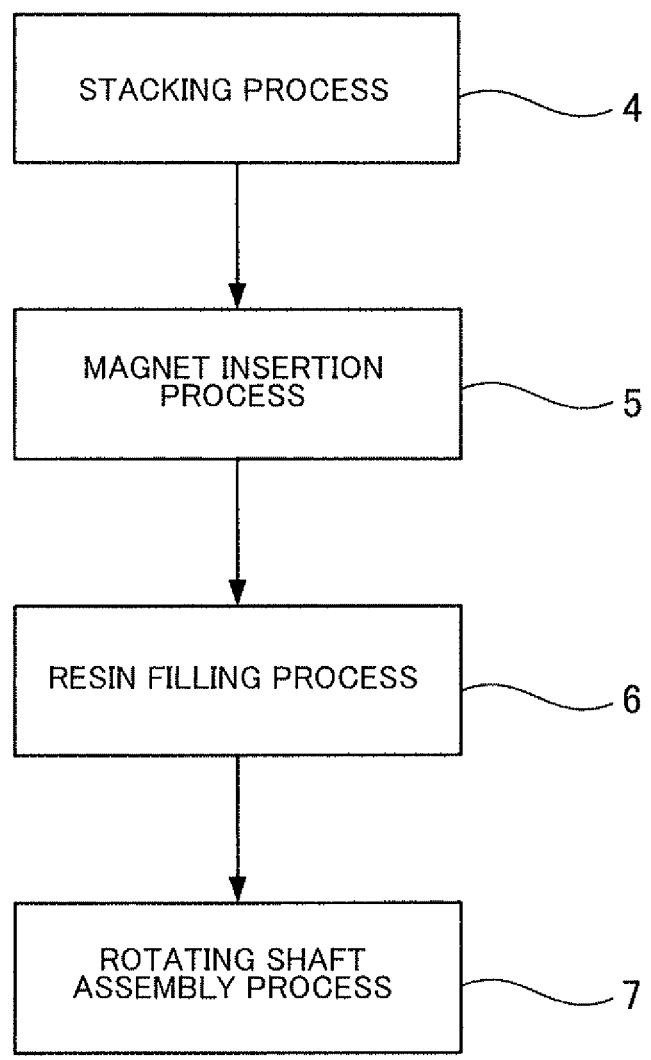
FIG. 5 is an explanatory view showing a production line in which a method for manufacturing a rotor for an electric motor is carried out according to the first embodiment.

As shown in FIG. 5, the method for manufacturing the rotor for an electric motor according to the embodiment includes a stacking process 4 in which the laminated iron core 3 is formed by stacking the iron core pieces 31 that are formed into a desired shape, a magnet insertion process 5 in which the permanent magnets 36 are inserted into the magnet insertion holes 33 provided in the laminated iron core 3, a resin filling process 6 in which the laminated iron core 3 is heated and the magnet insertion holes 33 are filled with the molten resin 34 for fixing the magnets, and a rotating shaft assembly process 7 in which a rotating shaft 35 is warm-fitted to the rotating shaft insertion hole 32 of the laminated iron core 3 by using residual heat from heating of the laminated iron core 3 in the resin filling process 6. In a production line where the method for manufacturing the rotor for an electric motor is carried out, a transfer rail is arranged at least between the terminal end portion of a device in the lamination process 4 and the starting end portion of a device in the rotating shaft assembly process 7, and is structured so that the later-described gate plate 2 is able to move on the transfer rail.

The lamination process 4 is a process in which the iron core piece 31 having the shape shown in FIG. 6 is punched out successively from a belt-like steel plate, and the iron core pieces 31 are stacked and crimped to each other so as to form the laminated iron core 3, and, a press machine (not shown) is used. As shown in FIG. 6, one rotating shaft insertion hole 32 to which the rotating shaft 35 (FIG. 7) is inserted, and sixteen magnet insertion holes 33 to which the permanent magnets 36 are inserted, are formed so as to penetrate the laminated iron core 3 in an axis direction. On the inner periphery of the rotating shaft insertion hole 32, the protrusions 321 are formed at positions that face each other. The protrusions 321 are provided to be fitted to key grooves (not shown) of the rotating shaft 35, and also used for positioning of the laminated iron core 3 to the gate plate 2.

Equipment that carries out the magnet insertion process 5 has a magnet insertion robot (not shown) which automatically inserts the permanent magnets 36 to the magnet insertion holes 33 of the laminated iron core 3.

The resin filling process 6 includes a heating device (not shown) which performs preliminary heating of the laminated iron core 3, and a resin filling device 1 which fills the magnet insertion holes 33 with the molten resin 34 for fixing the magnets and thermally cures the molten resin 34. The molten resin 34 according to the embodiment is made by heating a thermosetting resin and changing into a liquid state. The thermosetting resin is cured by heating in a liquid state, and, once cured, the thermosetting resin does not become a liquid state when heated.

The heating device used in the embodiment has a tunnel shape, and an electro-thermal heater is provided on an inner side of the heating device. The transfer rail is arranged inside the heating device, and is structured so that the later-described gate plate 2, on which the laminated iron core 3 is placed, is able to move on the transfer rail.

Figure 7:
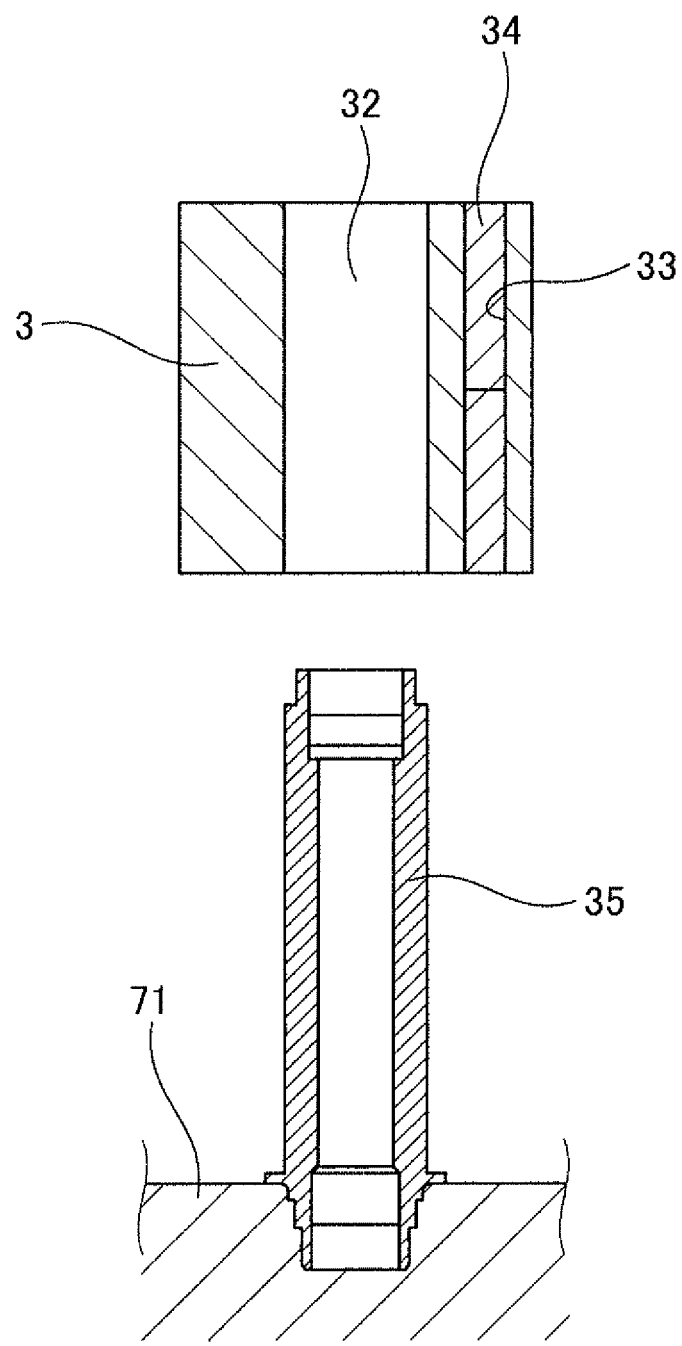
FIG. 7 is a sectional view showing a rotating shaft assembly process according to the first embodiment.

As shown in FIG. 7, an iron core assembly robot (not shown) which grips the laminated iron core 3 and automatically assembles the laminated iron core 3 to the rotating shaft 35, and a rotating shaft holding jig 71 which holds the rotating shaft 35 so that the rotating shaft 35 stands, are arranged in the rotating shaft assembly process 7.

Next, each of the manufacturing processes will be explained in more detail.

In the lamination process 4, the iron core piece 31 having the shape shown in FIG. 6 is punched out successively from the belt-like steel plate, and the iron core pieces 31 are laminated and crimped to each other, which forms the laminated iron core 3. The laminated iron core 3 is placed on the gate plate 2 at a transfer start point at the terminal end portion of the device in the lamination process 4. At this time, as shown in FIG. 3, the iron core positioning part 24 arranged on the upper face of the gate plate 2 is inserted to the rotating shaft insertion hole 32 of laminated iron core 3, and the protrusions 321 provided on the inner face of the rotating shaft insertion hole 32 are fitted to the positioning recessed grooves 241 provided on an outer face of the iron core positioning part 24, thereby positioning of the magnet insertion holes 33 of the laminated iron core 3 and the discharge outlets 22 of the gate plate 2 is performed. Next, the gate plate 2, on which the laminated iron core 3 is placed, moves on the transfer rail and transferred to the magnet insertion process 5. The laminated iron core 3 moves on the transfer rail in a state of being placed on the gate plate 2 to a transfer end point at the terminal end portion of the device in the resin filling process 6.

In the magnet insertion process 5 shown in FIG. 5, after the permanent magnets 36 are inserted to the magnet insertion holes 33 by the magnet insertion robot, the laminated iron core 3 moves to the resin filling process 6.

The laminated iron core 3 and the gate plate 2 are heated to a range of heating temperature from 150° C. to 200° C. by passing through the tunnel-shaped heating device disposed in the resin filling process 6, and then transferred into the resin filling device 1. In the resin filling device 1, the gate plate 2, on which the laminated iron core 3 is placed, is coupled to the mold body part 110 as shown in FIG. 1. At this time, the inner cylinder portion 112 of the feeding mechanism part 111 in the mold body part 110 is coupled to each of the resin flow paths 23 of the gate plate 2, and flow paths for the molten resin 34 are formed to the magnet insertion holes 33 of the laminated iron core 3.

After the gate plate 2, on which the laminated iron core 3 is placed, is arranged on the mold body part 110, and the gate plate 2 is coupled to the resin feeding mold 11, the opposing mold 12 is lowered and applies a compression force to an upper face of the laminated iron core 3. Thus, abutting faces of the opposing mold 12, the laminated iron core 3, and the resin feeding mold 11, which are sequentially disposed to be stacked, are closely brought into abutment with each other.

Next, by raising the plunger 113 of the feeding mechanism part 111 shown in FIG. 1, the molten resin 34 melted in the inner cylinder portion 112 is fed towards the in-flow parts 231 of the resin flow paths 23 of the gate plate 2. The molten resin 34 flown into the resin flow path 23 is fed to the two discharge outlets 22 through the branched part 232, and then fed to the magnet insertion hole 33 of the laminated iron core 3. The plunger 113 continues to rise until the magnet insertion hole 33 is filled with the molten resin 34. Then, after the magnet insertion hole 33 is filled with the molten resin 34, the plunger 113 stops rising, but continues to apply pressure to the molten resin 34 so that a pressurized state is maintained. While the pressurized state is maintained for a given period of time, the molten resin 34 is heated and cured. After the resin is cured, the plunger 113 of the feeding mechanism part 111 is returned to an initial position, and operations in the resin filling process 6 are completed. Next, the laminated iron core 3 is separated from the mold body part 110 together with the gate plate 2, and transferred from the resin filling process 6 to the rotating shaft assembly process 7.

At the transfer end point at the starting end portion of the device in the rotating shaft assembly process 7, the laminated iron core 3 is separated from the gate plate 2 by the iron core assembly robot. At this time, since cured resin is broken and separated in the diameter reducing parts 221 provided in the discharge outlets 22, no flash is made in the discharge outlets 22.

In the rotating shaft assembly process 7, the rotating shaft 35 is arranged on the rotating shaft holding jig 71 so as to stand, and the laminated iron core 3 is mounted on the rotating shaft 35 by the iron core assembly robot. At this time, the laminated iron core 3 is naturally cooled to a range of residual heat temperature from 140° C. to 180° C. while the laminated iron core 3 is moved from the resin filling device 1 provided in the resin filling process 6 onto the rotating shaft holding jig 71. In this temperature range, an inner diameter of the rotating shaft insertion hole 32 of the laminated iron core 3 is still larger than an outer diameter of the rotating shaft 35. By cooling the laminated iron core 3, the inner diameter of the rotating shaft insertion hole 32 is reduced, and, the laminated iron core 3 and the rotating shaft 35 are fixed to each other by warm fitting.

Next, operational effects of the embodiment will be explained.

In the embodiment, the discharge outlets 22 are provided, each of which has the diameter reducing part 221 in which the inner diameter is reduced gradually along the discharge direction of the molten resin 34 in the resin filling device 1. Therefore, when cured rein remaining on an inner side of the discharge outlet 22 is broken and separated, it is possible to break and separate the cured resin by concentrating stresses to a portion of the distal end of the diameter reducing part 221 where the diameter is the smallest. Therefore, a position of a broken and separated face is controlled easily, and a relatively smooth broken face is obtained where flash is unlikely to be made. This inhibits flash from being made in the end face of the laminated iron core 3. Hence, it is not necessary to provide a flash removal process for manufacturing the rotor for an electric motor. This makes it possible to improve production efficiency of the rotor for an electric motor, and reduce equipment costs and production costs.

Further, on the surface of the resin feeding mold 11, the projecting parts 222 are provided by projecting the peripheries of the discharge outlets 22, and, the diameter reducing parts 221 are provided in the projecting parts 222. Therefore, even if residual resin in the inner side of the discharge outlet 22 remains on the laminated iron core 3 side and small flash is produced, the flash is accommodated inwardly of the end face of the laminated iron core 3, and no negative effects due to the flash is caused. Therefore, it is possible to prevent problems from happening due to flash As explained so far, it is possible to reliably prevent the flash from being produced, and thus it is not necessary to provide a flash removal process in the production line of the rotor for an electric motor. Therefore, the rotating shaft assembly process 7 is arranged immediately after the resin filling process 6. Accordingly, it is possible to relatively easily realize the rotating shaft assembly process 7 in which warm fitting of the laminated iron core 3 and the rotating shaft 35 is performed by using residual heat from the resin filling process 6.

Moreover, on the surface of the resin feeding mold 11, the projecting parts 222 are provided by projecting the peripheries of the discharge outlets 22, and, the diameter reducing parts 221 are provided in the projecting parts 222. Therefore, the diameter reducing parts 221 are provided at positions located on the inner side of the laminated iron core 3 than the end face of the laminated iron core 3. Thus, even if the resin that is separated at the diameter reducing part 221 forms minute flash, the flash is located inwardly of the end face of the laminated iron core 3. Therefore, when the rotor for an electric motor is assembled as an electric motor, a component arranged around the laminated iron core 3 does not come into contact with the flash. Accordingly, problems caused by damage of the component and falling of the flash can be prevented.

The resin feeding mold 11 has the plate-like gate plate 2 on a surface of the resin feeding mold 11, which is brought into abutment with the end face of the laminated iron core 3, so that the gate plate 2 is able to be attached and detached, and the discharge outlets 22 are provided in the gate plate 2. Therefore, after the magnet insertion holes 33 of the laminated iron core 3 are filled with the resin, the resin feeding mold 11 and the gate plate 2 are separated from each other, and the gate plate 2 and the laminated iron core 3 are moved from the resin filling device 1 so that the next resin filling is able to be performed. Thus, stop time of the resin filling device 1 is reduced, and resin filling is carried out efficiently. After the gate plate 2 and the laminated iron core 3 are moved from the resin filling device 1 and the molten resin is cured, the gate plate 2 is separated from the laminated iron core 3 at an optimum timing. This makes it possible to remove an unnecessary resin member, and to more reliably prevent flash from being produced. The unnecessary resin member removed by the gate plate 2 is able to be removed from the gate plate 2 easily. Thus, it is possible to improve working efficiency and maintainability.

The gate plate 2 is structured so as to be usable as a pallet for transferring the laminated iron core 3. Therefore, by providing the transfer rail, continuous transfer is enabled, thereby transfer efficiency is improved.

Comparative Example 1

Here, a comparison was made regarding time for heating and cooling and energy consumption between an embodiment that is the method for manufacturing a rotor for an electric motor in which warm fitting is carried out in the rotating shaft assembly process 7 using residual heat from the resin filling process 6 by using the resin filling device 1 described in the first embodiment and a comparative example where the resin filling process 6 and the rotating shaft assembly process 7 are provided with dedicated heating devices, respectively.

Figure 8:
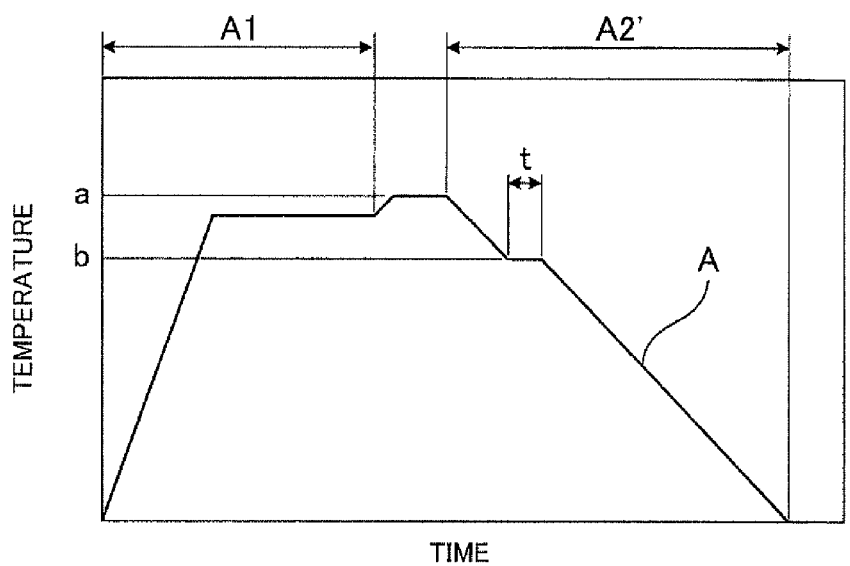
FIG. 8 is a time-temperature graph showing heating and cooling conditions in a resin filling process and the rotating shaft assembly process in the embodiment, according to the first embodiment.
Figure 9:
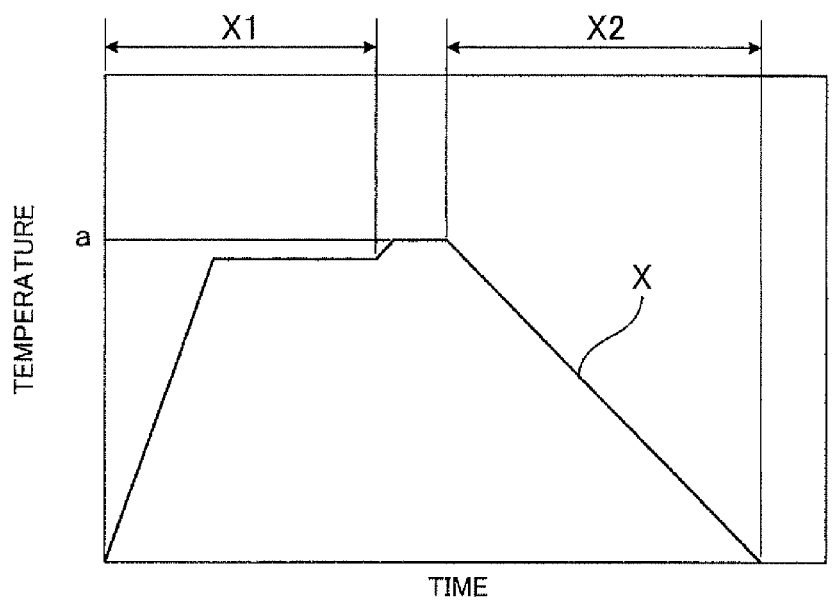
FIG. 9 is a time-temperature graph showing heating and cooling conditions in a resin filling process in a comparative example, according to Comparative Example 1.

In FIG. 8, changes of temperature of the laminated iron core 3 and time in the resin filling process 6 and the rotating shaft assembly process 7 of the embodiment are indicated by a solid line A. FIG. 8 is a graph that shows temperature of the laminated iron core 3 on the ordinate, and time on the abscissa. In FIG. 9, changes in temperature of the laminated iron core 3 and time in a resin filling process 6 of the comparative example are indicated by a solid line X, and, in FIG. 10, changes in temperature of the laminated iron core 3 and time in a rotating shaft assembly process 7 of the comparative example are indicated by a solid line Y.

In the embodiment, as shown in FIG. 8, heating and cooling are carried out once for the two processes of the resin filling process 6 and the rotating shaft assembly process 7. This requires a heating time A1 and a cooling time A2. In the embodiment, energy for heating up to a resin filling temperature a is consumed. The cooling time A2 is obtained by deducting a working time t for warm fitting in the rotating shaft assembly process 7 from A2' shown in the drawing.

Figure 10:
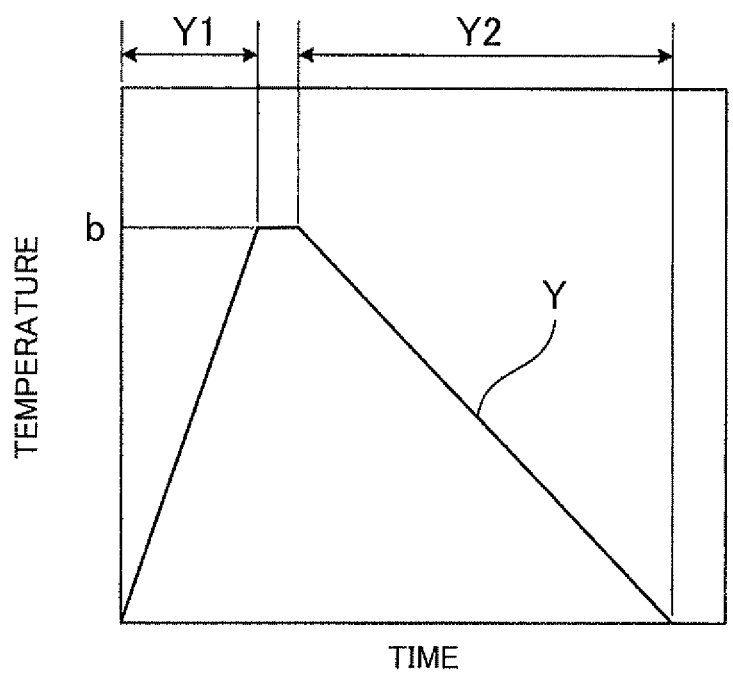
FIG. 10 is a time-temperature graph showing heating and cooling conditions in a rotating shaft assembly process in the comparative example, according to Comparative Example 1.

Meanwhile, in the comparative example, heating and cooling are carried out in each of the resin filling process 6 and the rotating shaft assembly process 7. This requires, as shown in FIG. 9, a heating time X1 and a cooling time X2 in the resin filling process 6, and, further requires, as shown in FIG. 10, a heating time Y1 and a cooling time Y2 in the rotating shaft assembly process 7. In the comparative example, energy for heating up to the resin filling temperature a is consumed similarly to the embodiment, and, in addition, energy for heating up to warm fitting temperature b is consumed. The heating time A1 in the embodiment, and the heating time X1 in the resin filling process 6 in the comparative example are generally the same, and the cooling time A2 in the embodiment and the cooling time X2 in the resin filling process 6 in the comparative example are generally the same Thus, in the embodiment, the heating time Y1 and the cooling time Y2 in the rotating shaft assembly process 7 can be reduced, and energy required for heating up to the warm fitting temperature b can be reduced in comparison to the comparative example.

The invention claimed is:

1. A resin filling device for a laminated iron core, the resin filling device being used when a magnet insertion hole provided in the laminated iron core of a rotor for an electric motor is filled with a molten resin for fixing a magnet, comprising:
   a resin feeding mold that is brought into abutment with a first end face of the laminated iron core in which an opening of the magnet insertion hole is made;
   an opposing mold that is brought into abutment with a second end face of the laminated iron core on the opposite side of the first end face with which the resin feeding mold is brought into abutment; and
   a pressing mechanism part that applies a compression force in a state where the laminated iron core is sandwiched between the resin feeding mold and the opposing mold, wherein
   the resin feeding mold includes one or more discharge outlets arranged so as to face the opening of the magnet insertion hole,
   and a feeding mechanism part that feeds the molten resin towards the discharge outlet,
   the discharge outlet includes a diameter reducing part in which an inner diameter is reduced gradually along a discharge direction of the molten resin,
   a projecting part made by projecting a periphery of the discharge outlet is provided on a surface of the resin feeding mold, and the diameter reducing part is provided inside of the projecting part, and
   the diameter reducing part is arranged at a position on an inner side of the laminated iron core between the first end face and second end face of the laminated iron core in the state where the laminated iron core is sandwiched between the resin feeding mold and the opposing mold.

2. The resin filling device for a laminated iron core according to claim 1, wherein the resin feeding mold has a plate-like gate plate on a surface of the resin feeding mold, which is brought into abutment with the first end face of the laminated iron core, so that the gate plate is able to be attached and detached, and the discharge outlet is provided in the gate plate.

3. The resin filling device for a laminated iron core according to claim 1, wherein the gate plate is structured to be usable as a pallet for transferring the laminated iron core.

4. The resin filling device for a laminated iron core according to claim 2, wherein the gate plate is structured to be usable as a pallet for transferring the laminated iron core.

* * * * *